(12) United States Patent
Zhou et al.

(10) Patent No.: US 10,284,256 B2
(45) Date of Patent: May 7, 2019

(54) NONLINEAR PRECODING BIT LOADING METHOD, TRANSMIT END, RECEIVE END, AND SYSTEM

(71) Applicant: HUAWEI TECHNOLOGIES CO., LTD., Shenzhen, Guangdong (CN)

(72) Inventors: Bin Zhou, Shenzhen (CN); Xiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/586,579

(22) Filed: May 4, 2017

(65) Prior Publication Data

US 2017/0237465 A1  Aug. 17, 2017

Related U.S. Application Data

(63) Continuation of application No. PCT/CN2014/090502, filed on Nov. 6, 2014.

(51) Int. Cl.
*H04B 3/32* (2006.01)
*H04B 3/50* (2006.01)
(Continued)

(52) U.S. Cl.
CPC .............. *H04B 3/32* (2013.01); *H04B 3/50* (2013.01); *H04L 5/0046* (2013.01); *H04L 5/143* (2013.01);
(Continued)

(58) Field of Classification Search
CPC ..... H04L 5/006; H04L 1/0026; H04L 1/0003; H04L 27/2646; H04L 5/0046; H04B 17/24
See application file for complete search history.

(56) References Cited

U.S. PATENT DOCUMENTS 5,852,630 A * 12/1998 Langberg ............ H04L 27/2647
375/219
7,295,518 B1  11/2007 Monk et al.
(Continued)

FOREIGN PATENT DOCUMENTS

CN  1787426 A  6/2006
CN  1863259 A  11/2006
(Continued)

OTHER PUBLICATIONS

International Search Report dated Aug. 5, 2015 in corresponding International Application No. PCT/CN2014/090502.
(Continued)

*Primary Examiner* — David S Huang
(74) *Attorney, Agent, or Firm* — Staas & Halsey LLP

(57) ABSTRACT

Embodiments of the present invention provide a nonlinear precoding bit loading method, a transmit end, a receive end, and a system. The method includes: determining, power control factors of multiple preset quantities of bits; obtaining, a first correspondence between the multiple preset quantities of bits and signal to noise ratios without power control; determining, a second correspondence between the multiple preset quantities of bits and signal to noise ratios with power control according to the power control factors and the first correspondence; and after actually measuring a signal to noise ratio with power control on a subcarrier, determining, according to the second correspondence, a preset quantity of bits corresponding to the actually measured signal to noise ratio with power control, using the determined preset quantity of bits as an actual bit loading quantity of the subcarrier, and notifying a transmit end of the actual bit loading quantity.

13 Claims, 9 Drawing Sheets

(51) Int. Cl.
*H04L 5/14* (2006.01)
*H04L 5/00* (2006.01)
*H04L 25/03* (2006.01)

(52) U.S. Cl.
CPC .......... *H04L 5/1438* (2013.01); *H04L 5/1476* (2013.01); *H04L 25/03343* (2013.01)

(56) References Cited

U.S. PATENT DOCUMENTS

2006/0120445 A1   6/2006  Okamura
2008/0056181 A1*  3/2008  Imamura ............... H04L 1/0003
                                                 370/329

FOREIGN PATENT DOCUMENTS

CN    101534138 A    9/2009
CN    101854328 A    10/2010
WO    2014054043 A1  4/2014

OTHER PUBLICATIONS

Extended European Search Report dated Aug. 29, 2017 in corresponding to European Patent Application No. 14905387.8.
Paris J.F. et al., "Improving the Adaptive Rate QAM-DFE Systems Performance by Using Tomlinson-Harashima Precoding", May 6, 2001, pp. 1216-1221, Institute of Electrical and Electronics Engineers, XP001067155.
Muller, F. C. B. F. et al., "Optimizing Power Normalization for G.fast Linear Precoder by Linear Programming", Jun. 10, 2014, pp. 4160-4166, Institute of Electrical and Electronics Engineers, XP032632083.
Ginis, G. et al., "A Multi-user Precoding Scheme achieving Crosstalk Cancellation with Application to DSL Systems", Oct. 29, 2000, pp. 1627-1632, Institute of Electrical and Electronics Engineers, XP032142514.
Chinese Office Action dated Dec. 12, 2018 from Chinese Patent Application No. 201480078543.3, 6 pages.

* cited by examiner

NONLINEAR PRECODING BIT LOADING METHOD, TRANSMIT END, RECEIVE END, AND SYSTEM

CROSS-REFERENCE TO RELATED APPLICATIONS

This application is a continuation of International Application No. PCT/CN2014/090502, filed on Nov. 6, 2014, the disclosure of which is hereby incorporated by reference in its entirety.

TECHNICAL FIELD

The present disclosure relates to the communications technologies, and in particular, to a nonlinear precoding bit loading method, a transmit end, a receive end, and a system.

BACKGROUND

A digital subscriber line (DSL for short) technology is a high-speed transmission technology for data transmission by using a telephone line, that is, an unshielded twisted pair (UTP for short), and includes an asymmetrical digital subscriber line (ADSL for short), a very-high-bit-rate digital subscriber line (VDSL for short), a very-high-bit-rate digital subscriber line 2 (VDSL2 for short), a single-pair high-bit-rate digital subscriber line (SHDSL for short), and the like. In various digital subscriber line (xDSL) technologies, xDSL for passband transmission uses a discrete multi-tone (DMT for short) modulation technology to perform modulation and demodulation. A system that provides access for multiple DSL signals is referred to as a DSL access multiplexer (DSLAM for short).

It may be learned from an electromagnetic induction principle that in time division duplex (TDD for short) mode, mutual interference is generated between multiple DSL signals that gain access to the DSLAM, and is referred to as crosstalk (Crosstalk). The crosstalk is classified into near-end crosstalk (NEXT) and far-end crosstalk (FEXT). Energy of the foregoing near-end crosstalk and far-end crosstalk increases with an increase of a frequency band. For a downstream channel, a next-generation copper line broadband access standard (Gfast) of time division multiplexing is used. Because an increasingly wide frequency band is used in the Gfast, the FEXT affects line transmission performance more severely. One method is to use a vectoring technology. That is, DSL signals of multiple users are jointly sent or received at a DSLAM end, FEXT interference is canceled by using a signal processing method, and therefore FEXT interference in each DSL signal is finally eliminated.

Specifically, for downstream, that is, when a signal is sent from the DSLAM end to a client, when joint pre-transmission processing is performed at the DSLAM end, a linear or nonlinear precoding solution may be used. That is, when DSL signals of multiple users are sent at the DSLAM end according to joint channel information between the DSLAM end and multiple clients, linear or nonlinear precoding is performed on the DSL signals, so as to eliminate FEXT interference in each DSL signal. Existing research on nonlinear precoding applied to the DSL mainly focuses on performance of the nonlinear precoding. Generally, a receive end determines a bit loading quantity by using a fixed nonlinear precoding modulus value and an actually measured signal to noise ratio (SNR for short), so that a transmit end may send information about corresponding bits to the receive end according to the bit loading quantity determined by the receive end.

However, it may be found by analyzing and simulating a nonlinear precoding bit loading solution applied to the DSL that the nonlinear precoding modulus value affects the DSLAM end, that is, signal power when the transmit end sends the information about the corresponding bits to the receive end according to the foregoing bit loading quantity, the signal power affects an SNR of a signal received by the receive end, and the SNR affects a bit error rate of the receive end. Therefore, poor system reliability is caused.

SUMMARY

Embodiments of the present invention provide a nonlinear precoding bit loading method, a transmit end, a receive end, and a system, so as to resolve a poor system reliability problem that is caused because a receive end determines a bit loading quantity by using a fixed nonlinear precoding modulus value and an actually measured signal to noise ratio in the prior art.

According to a first aspect of the present invention, a nonlinear precoding bit loading method is provided, including:

determining, by a receive end, power control factors of multiple preset quantities of bits, where the receive end supports information transmission in multiple bit loading modes, and the multiple bit loading modes refer to multiple modes in which the multiple preset quantities of bits are separately loaded on a single subcarrier;

obtaining, by the receive end, a first correspondence between the multiple preset quantities of bits and signal to noise ratios without power control;

determining, by the receive end, a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, determining, by the receive end according to the second correspondence, a preset quantity of bits corresponding to the actually measured signal to noise ratio with power control, using the determined preset quantity of bits as an actual bit loading quantity of the single subcarrier, and notifying a transmit end of the actual bit loading quantity.

In a first possible implementation manner, according to the first aspect, the determining, by a receive end, power control factors of multiple preset quantities of bits includes:

determining, by the receive end, the power control factors of the multiple preset quantities of bits according to a preset modulus value determining rule, a preset modulus value determining parameter, and a preset power control factor determining rule.

In a second possible implementation manner, according to the first aspect, the determining, by a receive end, power control factors of multiple preset quantities of bits includes:

sending, by the receive end to the transmit end, nonlinear precoding modulus values of the multiple preset quantities of bits, or a preset modulus value determining rule and a preset modulus value determining parameter, so that the transmit end determines the power control factors of the multiple preset quantities of bits; and receiving, by the receive end, the power control factors that are of the multiple preset quantities of bits and that are sent by the transmit end.

According to a second aspect of the present invention, a nonlinear precoding bit loading method is provided, including:

receiving, by a transmit end, an actual bit loading quantity that is of a single subcarrier and that is notified by a receive end, where the actual bit loading quantity of the single subcarrier is determined according to a second correspondence between multiple preset quantities of bits and signal to noise ratios with power control after the receive end actually measures a signal to noise ratio with power control on the subcarrier, and is a preset quantity of bits corresponding to the actually measured signal to noise ratio with power control; the second correspondence is determined by the receive end according to power control factors that are of the multiple preset quantities of bits and that are determined by the receive end and according to a first correspondence that is between the multiple preset quantities of bits and signal to noise ratios without power control and that is obtained by the receive end; each of the power control factors reflects a relationship between a signal to noise ratio without power control and a signal to noise ratio with power control; the receive end supports information transmission in multiple bit loading modes; and the multiple bit loading modes refer to multiple modes in which the multiple preset quantities of bits are separately loaded on the single subcarrier.

In a first possible implementation manner, according to the second aspect, before the receiving, by a transmit end, an actual bit loading quantity that is of a single subcarrier and that is notified by a receive end, the method further includes:

sending, by the transmit end, a preset power control factor determining rule to the receive end, so that the receive end determines the power control factors of the multiple preset quantities of bits.

According to a third aspect of the present invention, a receive end is provided, including:

a determining module, configured to determine power control factors of multiple preset quantities of bits, where the receive end supports information transmission in multiple bit loading modes, and the multiple bit loading modes refer to multiple modes in which the multiple preset quantities of bits are separately loaded on a single subcarrier;

an obtaining module, configured to obtain a first correspondence between the multiple preset quantities of bits and signal to noise ratios without power control; where the determining module is further configured to determine a second correspondence between the multiple preset quantities of bits and signal to noise ratios with power control according to the power control factors and the first correspondence, where each of the power control factors reflects a relationship between a signal to noise ratio without power control and a signal to noise ratio with power control; and the determining module is further configured to: after actually measuring a signal to noise ratio with power control on the subcarrier, determine, according to the second correspondence, a preset quantity of bits corresponding to the actually measured signal to noise ratio with power control; and a notification module, configured to use the determined preset quantity of bits as an actual bit loading quantity of the single subcarrier, and notify a transmit end of the actual bit loading quantity.

In a first possible implementation manner, according to the third aspect, the determining module is specifically configured to:

determine the power control factors of the multiple preset quantities of bits according to a preset modulus value determining rule, a preset modulus value determining parameter, and a preset power control factor determining rule.

In a second possible implementation manner, according to the third aspect, the determining module is specifically configured to:

send nonlinear precoding modulus values of the multiple preset quantities of bits, or a preset modulus value determining rule and a preset modulus value determining parameter to the transmit end, so that the transmit end determines the power control factors of the multiple preset quantities of bits; and receive the power control factors that are of the multiple preset quantities of bits and that are sent by the transmit end.

According to a fourth aspect of the present invention, a transmit end is provided, including:

a receiving module, configured to receive an actual bit loading quantity that is of a single subcarrier and that is notified by a receive end, where the actual bit loading quantity of the single subcarrier is determined according to a second correspondence between multiple preset quantities of bits and signal to noise ratios with power control after the receive end actually measures a signal to noise ratio with power control on the subcarrier, and is a preset quantity of bits corresponding to the actually measured signal to noise ratio with power control; the second correspondence is determined by the receive end according to power control factors that are of the multiple preset quantities of bits and that are determined by the receive end and according to a first correspondence that is between the multiple preset quantities of bits and signal to noise ratios without power control and that is obtained by the receive end; each of the power control factors reflects a relationship between a signal to noise ratio without power control and a signal to noise ratio with power control; the receive end supports information transmission in multiple bit loading modes; and the multiple bit loading modes refer to multiple modes in which the multiple preset quantities of bits are separately loaded on the single subcarrier.

In a first possible implementation manner, according to the fourth aspect, the transmit end further includes:

a sending module, configured to send a preset power control factor determining rule to the receive end, so that the receive end determines the power control factors of the multiple preset quantities of bits.

According to a fifth aspect of the present invention, a receive end is provided, including:

a processor, configured to determine power control factors of multiple preset quantities of bits, where the receive end supports information transmission in multiple bit loading modes, and the multiple bit loading modes refer to multiple modes in which the multiple preset quantities of bits are separately loaded on a single subcarrier; where the processor is further configured to obtain a first correspondence between the multiple preset quantities of bits and signal to noise ratios without power control;

the processor is further configured to determine a second correspondence between the multiple preset quantities of bits and signal to noise ratios with power control according to the power control factors and the first correspondence, where each of the power control factors reflects a relationship between a signal to noise ratio without power control and a signal to noise ratio with power control; and the processor is further configured to: after actually measuring a signal to noise ratio with power control on the subcarrier, determine, according to the second correspondence, a preset quantity of bits corresponding to the actually measured signal to noise ratio with power control; and a transmitter, configured to use the determined preset quantity of bits as an actual bit loading quantity of the single subcarrier, and notify a transmit end of the actual bit loading quantity.

In a first possible implementation manner, according to the fifth aspect, the processor is specifically configured to:

determine the power control factors of the multiple preset quantities of bits according to a preset modulus value determining rule, a preset modulus value determining parameter, and a preset power control factor determining rule.

In a second possible implementation manner, according to the fifth aspect, the processor is specifically configured to:

send nonlinear precoding modulus values of the multiple preset quantities of bits, or a preset modulus value determining rule and a preset modulus value determining parameter to the transmit end, so that the transmit end determines the power control factors of the multiple preset quantities of bits; and receive the power control factors that are of the multiple preset quantities of bits and that are sent by the transmit end.

According to a sixth aspect of the present invention, a transmit end is provided, including:

a receiver, configured to receive an actual bit loading quantity that is of a single subcarrier and that is notified by a receive end, where the actual bit loading quantity of the single subcarrier is determined according to a second correspondence between multiple preset quantities of bits and signal to noise ratios with power control after the receive end actually measures a signal to noise ratio with power control on the subcarrier, and is a preset quantity of bits corresponding to the actually measured signal to noise ratio with power control; the second correspondence is determined by the receive end according to power control factors that are of the multiple preset quantities of bits and that are determined by the receive end and according to a first correspondence that is between the multiple preset quantities of bits and signal to noise ratios without power control and that is obtained by the receive end; each of the power control factors reflects a relationship between a signal to noise ratio without power control and a signal to noise ratio with power control; the receive end supports information transmission in multiple bit loading modes; and the multiple bit loading modes refer to multiple modes in which the multiple preset quantities of bits are separately loaded on the single subcarrier.

In a first possible implementation manner, according to the sixth aspect, the transmit end further includes:

a transmitter, configured to send a preset power control factor determining rule to the receive end, so that the receive end determines the power control factors of the multiple preset quantities of bits.

According to a seventh aspect of the present invention, a system is provided, including the receive end according to any one of the possible implementation manners of the third aspect and the transmit end according to any one of the possible implementation manners of the fourth aspect.

According to an eighth aspect of the present invention, a system is provided, including the receive end according to any one of the possible implementation manners of the fifth aspect and the transmit end according to any one of the possible implementation manners of the sixth aspect.

In the bit loading solution in the embodiments of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in the embodiments of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in the embodiments of the present invention, the receive end can reach the expected bit error rate, and system reliability is high.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
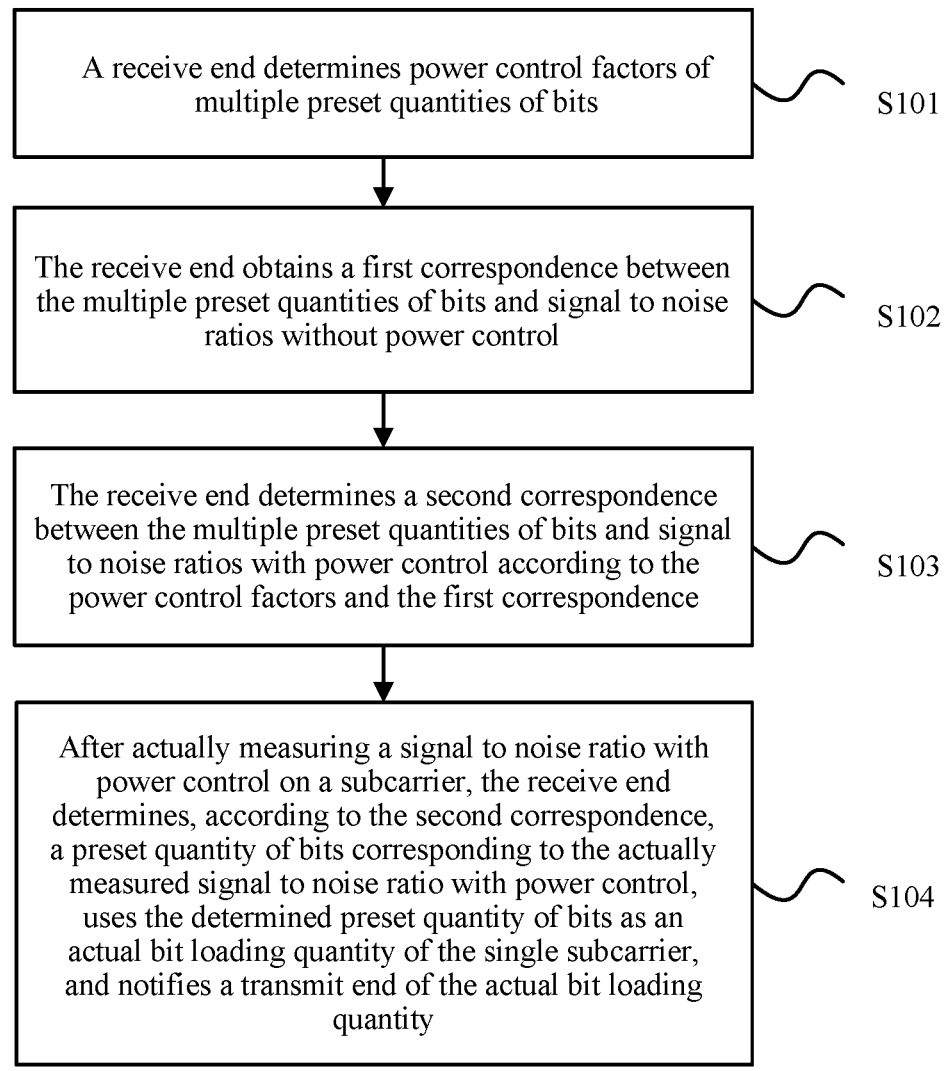
FIG. 1 is a schematic flowchart of a nonlinear precoding bit loading method according to Embodiment 1 of the present invention.

FIG. 1 is a schematic flowchart of a nonlinear precoding bit loading method according to Embodiment 1 of the present invention. This embodiment may be applied to a scenario in which a receive end determines a bit loading solution when a digital subscriber line (DSL for short) technology is used for data transmission. Both a receive end and a transmit end in this embodiment support information transmission in multiple bit loading modes. The foregoing multiple bit loading modes refer to multiple modes in which multiple preset quantities of bits are separately loaded on a single subcarrier.

As shown in FIG. 1, the method includes the following steps.

S101. The receive end determines power control factors of multiple preset quantities of bits.

S102. The receive end obtains a first correspondence between the multiple preset quantities of bits and signal to noise ratios without power control.

S103. The receive end determines a second correspondence between the multiple preset quantities of bits and signal to noise ratios with power control according to the power control factors and the first correspondence.

S104. After actually measuring a signal to noise ratio with power control on a subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies the transmit end of the actual bit loading quantity.

An execution body of the foregoing steps may be the receive end, and in actual implementation, the execution body may be a client that receives a DSL signal. The foregoing transmit end may be a DSL access multiplexer (DSLAM for short).

Specifically, the receive end may first determine the power control factors of the multiple preset quantities of bits. The foregoing power control factor indicates a factor for performing power control on a signal when the transmit end sends the signal to the receive end. For example, if the power control factor is 0.5, it indicates that the transmit end reduces power of the sent signal by half. Actually, the foregoing power control factor reflects a relationship between a signal to noise ratio (SNR for short) without power control and a signal to noise ratio with power control. The signal to noise ratio without power control indicates an SNR when the transmit end does not perform power control on a sent signal, and the SNR with power control indicates an SNR after the transmit end performs power control on a sent signal. Optionally, the receive end may determine the power control factors of the foregoing multiple preset quantities of bits according to a preset rule used to calculate a power control factor, and a preset parameter. It should be noted that the power control factors of the foregoing multiple preset quantities of bits indicate multiple power control factors respectively corresponding to the multiple preset quantities of bits. The multiple power control factors may be the same, or may be different. This is not specifically limited herein.

The receive end may obtain the first correspondence between the multiple preset quantities of bits and the SNRs without power control. Optionally, the foregoing first correspondence may be obtained according to a corresponding curve between a bit error rate and an SNR without power control. A method for obtaining the first correspondence is the same as that in the prior art, and details are not described herein. In actual implementation, the receive end itself may calculate the first correspondence, or may obtain the foregoing first correspondence from a notification message sent from a higher layer. In addition, it should be noted that there is no limitation on a sequence of implementing step S101 and step S102.

Because the foregoing first correspondence does not represent power control performed by the transmit end on a sent signal, the receive end may determine the second correspondence between the foregoing multiple preset quantities of bits and the signal to noise ratios with power control according to the first correspondence and with reference to the power control factors of the foregoing multiple preset quantities of bits. For example, if the foregoing first correspondence is indicated as ($SNR_b$, b) by using a table, where b indicates a preset quantity of bits, $SNR_b$ indicates an SNR without power control, and a power control factor that is of the preset quantity b of bits and that is determined by the receive end is $D_b$, the receive end may convert ($SNR_b$, b) into a table ($D_b^2 \times SNR_b$, b). The new table ($D_b^2 \times SNR_b$, b) is a second correspondence between the preset quantity b of bits and a signal to noise ratio with power control.

After the receive end actually measures the signal to noise ratio with power control on the subcarrier, the receive end may determine, according to the foregoing second correspondence, the preset quantity of bits corresponding to the actually measured signal to noise ratio with power control, uses the preset quantity of bits determined by the receive end as the actual bit loading quantity of the single subcarrier, and notifies the transmit end of the actual bit loading quantity. ($D_b^2 \times SNR_b$, b) indicated by using the foregoing table is used as an example. The receive end may obtain, by only looking up the table, the preset quantity of bits corresponding to the actually measured signal to noise ratio with power control. Certainly, the table is merely an example herein, and in actual implementation, a method for obtaining the preset quantity of bits is not limited to this implementation manner. It should be noted that if the receive end and the transmit end transmit information by using multiple subcarriers, the foregoing operation may be repeated. That is, an actual bit loading quantity of each subcarrier is determined according to an actually measured signal to noise ratio with power control on each subcarrier, and then the actual bit loading quantity is notified to the transmit end. The following uses a single subcarrier as an example for description.

In addition, optionally, in actual implementation, the receive end may determine the actual bit loading quantity of the single subcarrier by traversing the multiple preset quantities of bits. For example, for a subcarrier, an SNR actually measured by the receive end on the subcarrier is SNR1, and the receive end may first assume that an actual bit loading quantity of the subcarrier is b1, and determine a power control factor D1 of b1. It may be learned from the foregoing description that a meaning of a power control factor is power control performed by the transmit end on a sent signal, and therefore a manner of power adjustment performed by the transmit end on the sent signal may be learned from D1. For example, D1 herein is corresponding to that the transmit end reduces power of the sent signal by half, and corresponding to an SNR is that the actually sent SNR is reduced by three decibels (dB) compared with an SNR without power control. Therefore, the receive end may add 3 dB to SNR1 to obtain SNR2, where SNR2 should be the SNR without power control, and then the receive end looks up, according to the foregoing first correspondence, for a quantity of bits corresponding to SNR2. If the quantity of bits is equal to b1, it may be determined that the actual bit loading quantity corresponding to the subcarrier is b1. If the quantity of bits is not equal to b1, a preset quantity of bits supported by another system may continue to be traversed, and by analog, until the actual bit loading quantity of the subcarrier is determined.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 2:
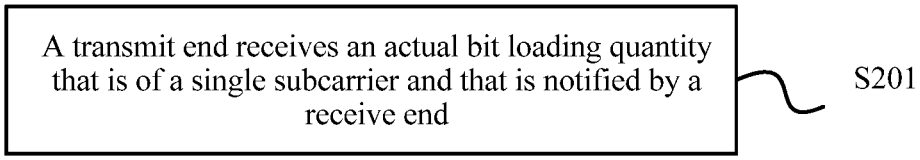
FIG. 2 is a schematic flowchart of a nonlinear precoding bit loading method according to Embodiment 2 of the present invention.

FIG. 2 is a schematic flowchart of a nonlinear precoding bit loading method according to Embodiment 2 of the present invention. Both a receive end and a transmit end in this embodiment support information transmission in multiple bit loading modes. The foregoing multiple bit loading modes refer to multiple modes in which multiple preset quantities of bits are separately loaded on a single subcarrier. As shown in FIG. 2, the method includes the following steps.

S201. The transmit end receives an actual bit loading quantity that is of a single subcarrier and that is notified by the receive end.

An execution body of the foregoing step may be the receive end, and in actual implementation, the execution body may be a client that receives a DSL signal. The foregoing transmit end may be a DSLAM.

Specifically, the transmit end may receive the actual bit loading quantity that is of the single subcarrier and that is notified by the receive end. The actual bit loading quantity of the foregoing single subcarrier is determined according to a second correspondence between multiple preset quantities of bits and signal to noise ratios with power control after the receive end actually measures a signal to noise ratio with power control on the subcarrier, and is a preset quantity of bits corresponding to the foregoing actually measured signal to noise ratio with power control. The foregoing second correspondence is determined by the receive end according to power control factors that are of the multiple preset quantities of bits and that are determined by the receive end and according to a first correspondence that is between the multiple preset quantities of bits and signal to noise ratios without power control and that is obtained by the receive end. Specific meanings of the foregoing power control factor, the signal to noise ratio without power control, and the signal to noise ratio with power control are the same as those in the foregoing embodiment, and details are not described herein again.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 3A:
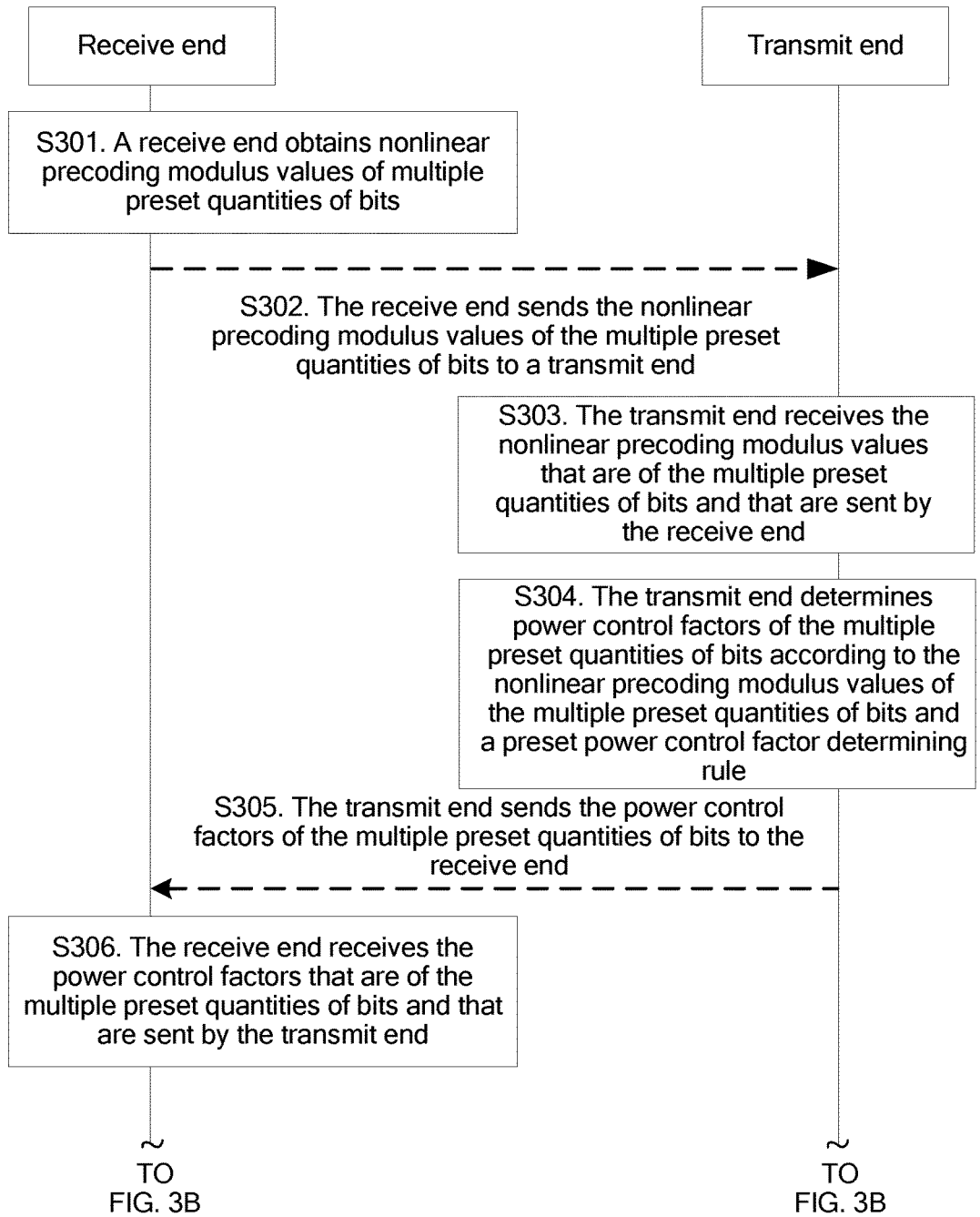
FIG. 3A and FIG. 3B are a schematic flowchart of a nonlinear precoding bit loading method according to Embodiment 3 of the present invention.
Figure 3B:
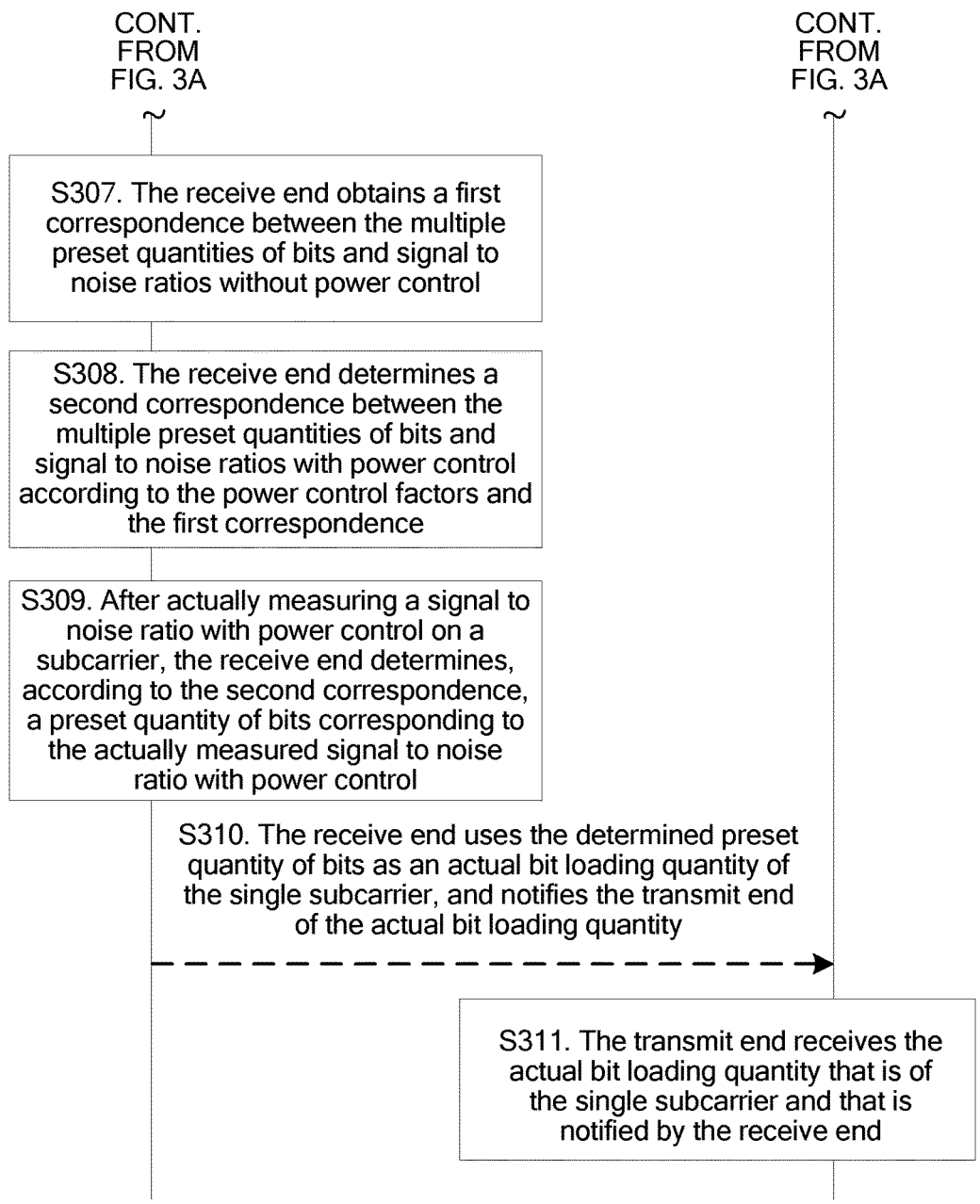

FIG. 3A and FIG. 3B are a schematic flowchart of a nonlinear precoding bit loading method according to Embodiment 3 of the present invention. In this embodiment, a receive end sends a required parameter used to determine power control factors of multiple preset quantities of bits to a transmit end, and after determining the power control factors of the multiple preset quantities of bits, the transmit end sends the power control factors to the receive end. An execution body of the following steps may be the receive end, and in actual implementation, the execution body may be a client that receives a DSL signal. The foregoing transmit end may be a DSLAM.

Specifically, as shown in FIG. 3A and FIG. 3B, the method includes the following steps.

S301. The receive end obtains nonlinear precoding modulus values of multiple preset quantities of bits.

Specifically, the receive end may determine the nonlinear precoding modulus values of the multiple preset quantities of bits according to a preset modulus value determining rule and a preset modulus value determining parameter. A meaning of the foregoing nonlinear precoding modulus values is the same as that of a modulus value used in a process of performing nonlinear precoding on a DSL signal in the prior art, and details are not described herein.

Specifically, the foregoing preset modulus value determining rule may be a rule by which a preset quantity of bits is used to determine a nonlinear precoding modulus value corresponding to the preset quantity of bits. For example, the following formula may be used:

$$M_b = 2\left(MB_b + 10^{\frac{CG}{20}}\right) \quad (1)$$

where $M=2^b$, $1 \le b \le B\_max$, b indicates the foregoing preset quantity of bits, B_max indicates a maximum quantity of bits supported by a system, $M_b$ indicates a nonlinear precoding modulus value of b bits, that is, there are four points on a constellation diagram, CG indicates a precoding gain, that is, the foregoing preset modulus value determining parameter, and $MB_b$ indicates a maximum horizontal or vertical boundary of the quadrature amplitude modulation (QAM for short) constellation diagram of b bits.

Figure 4:
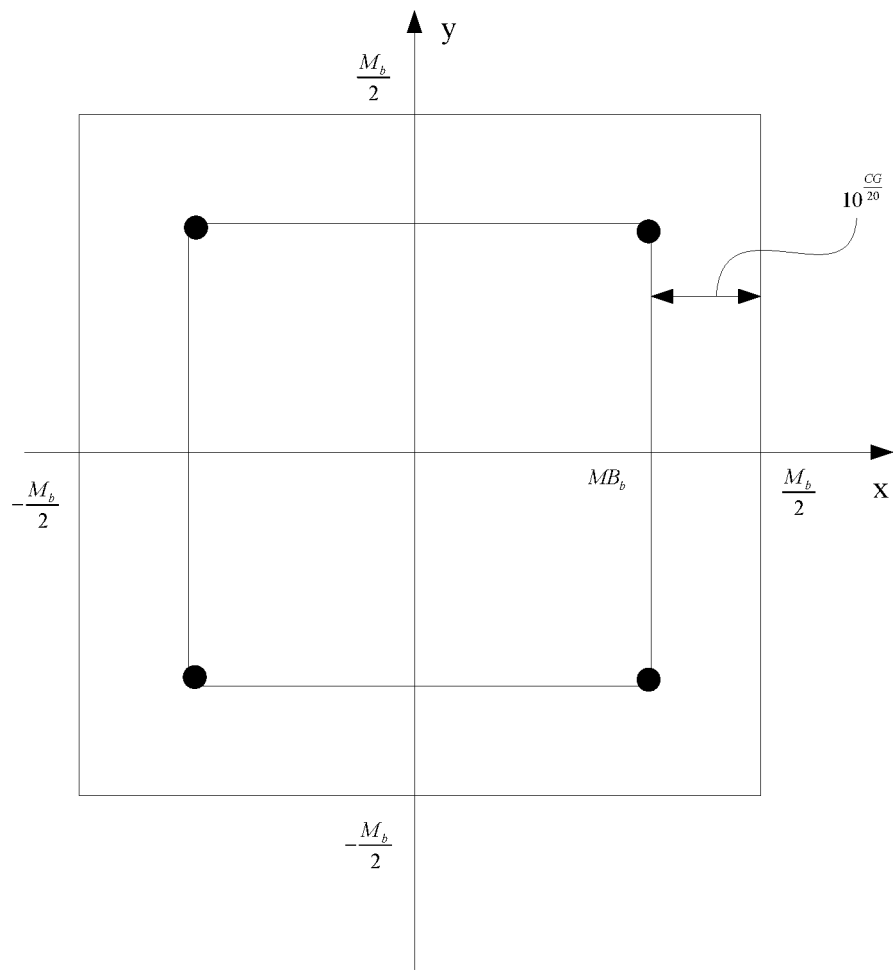
FIG. 4 is a schematic diagram of a nonlinear precoding modulus value according to Embodiment 3 of the present invention.

FIG. 4 is used as an example, b is 2, there are four points on a QAM constellation diagram of two bits, and a maximum horizontal or vertical boundary of the QAM constellation diagram is $MB_b$ marked in a horizontal axis x. It may be learned according to a nonlinear precoding solution applied to a DSL that a sent signal needs to be confined to a dashed box $$\left[-\frac{M_b}{2}, \frac{M_b}{2}\right] \times \left[-\frac{M_b}{2}, \frac{M_b}{2}\right]$$

shown in FIG. 4, so that the receive end correctly performs decoding, and $M_b$ is greater than $MB_b$ in this case. This is because after the sent signal reaches the receive end, the sent signal is affected by noise in actual implementation. Therefore, the horizontal axis x is used as an example, and a point modulated by the transmit end is indicated by using a solid black dot. A point interfered by the noise is still within the dashed box provided that the noise does not exceed $$10^{\frac{CG}{20}},$$

and therefore, the receive end can still correctly perform decoding. Meanings of symbols in the following are the same as those described above, and details are not subsequently described again.

The receive end may determine the nonlinear precoding modulus values of the multiple preset quantities of bits according to the foregoing formula (1).

S302. The receive end sends the nonlinear precoding modulus values of the multiple preset quantities of bits to the transmit end.

Specifically, in actual implementation, the receive end may agree with the transmit end in advance upon a location of the nonlinear precoding modulus values of the multiple preset quantities of bits. For example, a format used to send information about the foregoing nonlinear precoding modulus values is agreed upon, and the transmit end may separately read the nonlinear precoding modulus values of the multiple preset quantities of bits from a specific location. Certainly, the receive end may send both the multiple preset quantities of bits and the nonlinear precoding modulus values corresponding to the multiple preset quantities of bits to the transmit end. This is not limited herein.

S303. The transmit end receives the nonlinear precoding modulus values that are of the multiple preset quantities of bits and that are sent by the receive end.

Optionally, if the receive end agrees with the transmit end upon the format used to send the information about the foregoing nonlinear precoding modulus values, the transmit end may separately read the nonlinear precoding modulus values of the multiple preset quantities of bits from the specific location.

S304. The transmit end determines power control factors of the multiple preset quantities of bits according to the nonlinear precoding modulus values of the multiple preset quantities of bits and a preset power control factor determining rule.

Specifically, for the multiple preset quantities of bits, the transmit end may determine the power control factors of the multiple preset quantities of bits according to the nonlinear precoding modulus values that are corresponding to the multiple preset quantities of bits and that are sent by the receive end, and according to the preset power control factor determining rule. The foregoing power control factor determining rule may be a corresponding function relationship between the nonlinear precoding modulus values of the multiple preset quantities of bits and the power control factors. The power control factor determining rule is the same as a rule by which the transmit end determines the power control factors of the multiple preset quantities of bits according to the nonlinear precoding modulus values of the multiple preset quantities of bits in the prior art, and details are not described herein.

S305. The transmit end sends the power control factors of the multiple preset quantities of bits to the receive end.

S306. The receive end receives the power control factors that are of the multiple preset quantities of bits and that are sent by the transmit end.

S307. The receive end obtains a first correspondence between the multiple preset quantities of bits and signal to noise ratios without power control.

Description of this step is the same as that of step S102, and details are not described herein again.

S308. The receive end determines a second correspondence between the multiple preset quantities of bits and signal to noise ratios with power control according to the power control factors and the first correspondence.

S309. After actually measuring a signal to noise ratio with power control on a subcarrier, the receive end determines, according to the second correspondence, a preset quantity of bits corresponding to the actually measured signal to noise ratio with power control.

S310. The receive end uses the determined preset quantity of bits as an actual bit loading quantity of the single subcarrier, and notifies the transmit end of the actual bit loading quantity.

Description of the foregoing steps S308 to S310 is separately the same as that of steps S103 and S104. It should be noted that there is no limitation on a sequence of implementing steps S301 to S306 and step S307.

In addition, in actual implementation, when the first correspondence is determined, a power control factor of a bit loading quantity pre-stored by the receive end may be further considered. The pre-stored bit loading quantity herein, for example, may be a bit loading quantity in a bit loading solution currently used by the receive end, and a power control factor of the bit loading quantity.

The following uses an example in which the transmit end and the receive end exchange information by using a table to describe the foregoing process in detail.

For example, in step S301, the receive end determines $M_b$ of the preset quantity b of bits, and the receive end may send a table (b, $M_b$) to the transmit end in step S302. In step S304, the transmit end determines a table (b, $D_b$) according to the table (b, $M_b$), where $D_b$ indicates a power control factor of the preset quantity b of bits, and then sends the table (b, $D_b$) to the receive end. In step S307, the receive end determines, according to ($b_c$, $D_c$), the table (b, $D_b$) sent by the receive end, and a table ($SNR_b$, b) in step S303, that is, the first correspondence between the foregoing multiple preset quantities of bits and the SNRs without power control, the SNRs with power control corresponding to the multiple preset quantities of bits, where $b_c$ indicates the foregoing pre-stored bit loading quantity, $D_c$ indicates the power control factor of the foregoing pre-stored bit loading quantity, and $SNR_b$ indicates an SNR without power control. Specifically, ($SNR_b$, b) may be converted, and $SNR_b$ is converted into $$\frac{D_b^2}{D_c^2} \times SNR_b,$$

and a new table $$\left(\frac{D_b^2}{D_c^2} \times SNR_b, b\right)$$

is generated. In this case, the preset quantity b of bits in this new table is corresponding to an SNR with power control after power control is performed. That is, this SNR with power control is the SNR with power control that is obtained by the receive end by means of actual measurement and that is on the subcarrier. Finally, the receive end may measure the SNR with power control on the subcarrier, look up the table $$\left(\frac{D_b^2}{D_c^2} \times SNR_b, b\right),$$

obtain the preset quantity of bits corresponding to the actually measured signal to noise ratio with power control on the subcarrier, use the preset quantity of bits as the actual bit loading quantity of the single subcarrier, and notify the transmit end of the actual bit loading quantity.

S311. The transmit end receives the actual bit loading quantity that is of the single subcarrier and that is notified by the receive end.

Description of this step is the same as that of step S201, and details are not described herein again.

Optionally, after step S311, the single subcarrier is used as an example. After the actual bit loading quantity on the subcarrier is determined, the transmit end may send information about the actual bit loading quantity to the receive end by using the subcarrier and according to a power control factor of the subcarrier, and the receive end may also receive, by using the subcarrier, the information that is about the actual bit loading quantity and that is sent by the transmit end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 5A:
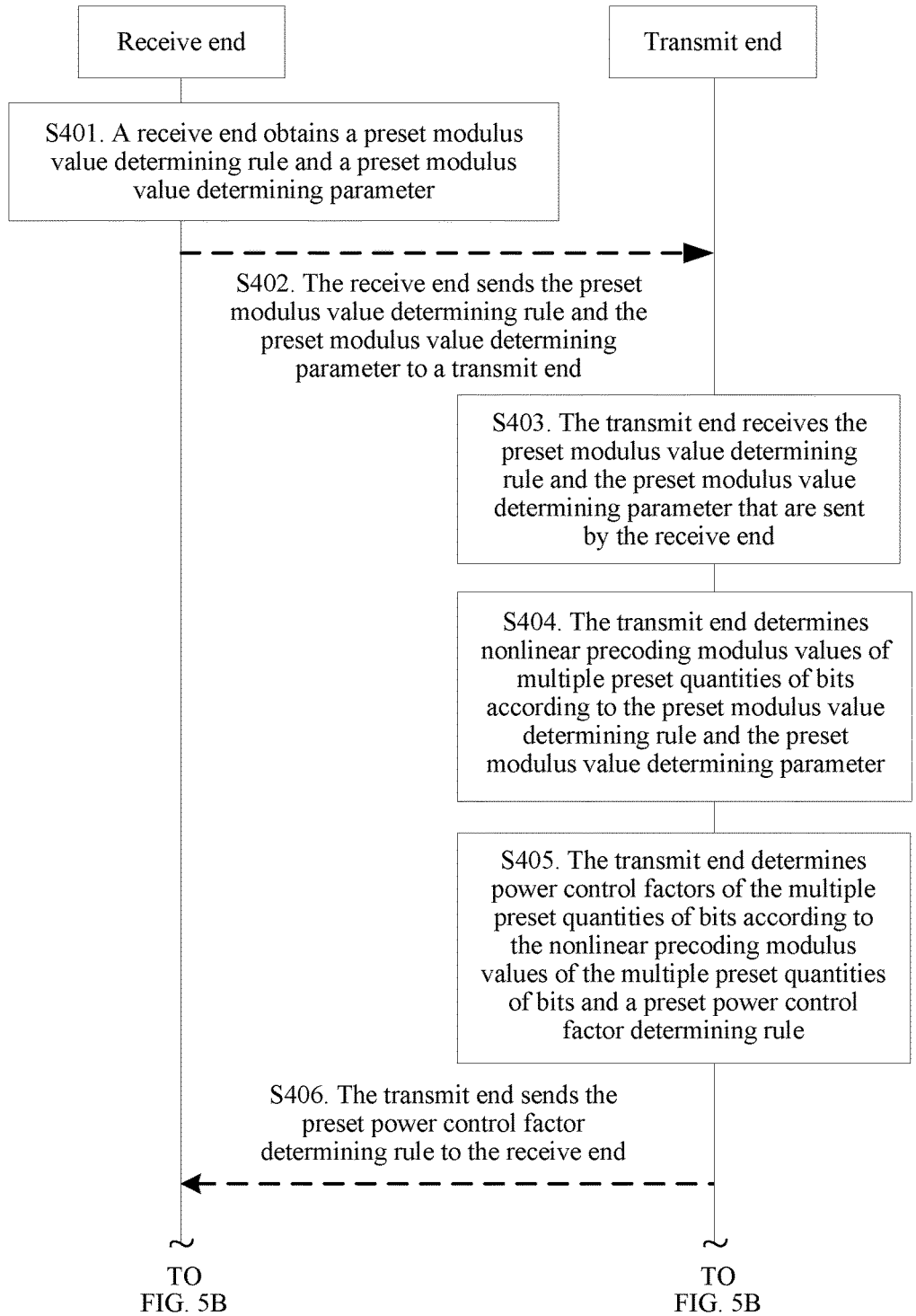
FIG. 5A and FIG. 5B are a schematic flowchart of a nonlinear precoding bit loading method according to Embodiment 4 of the present invention.
Figure 5B:
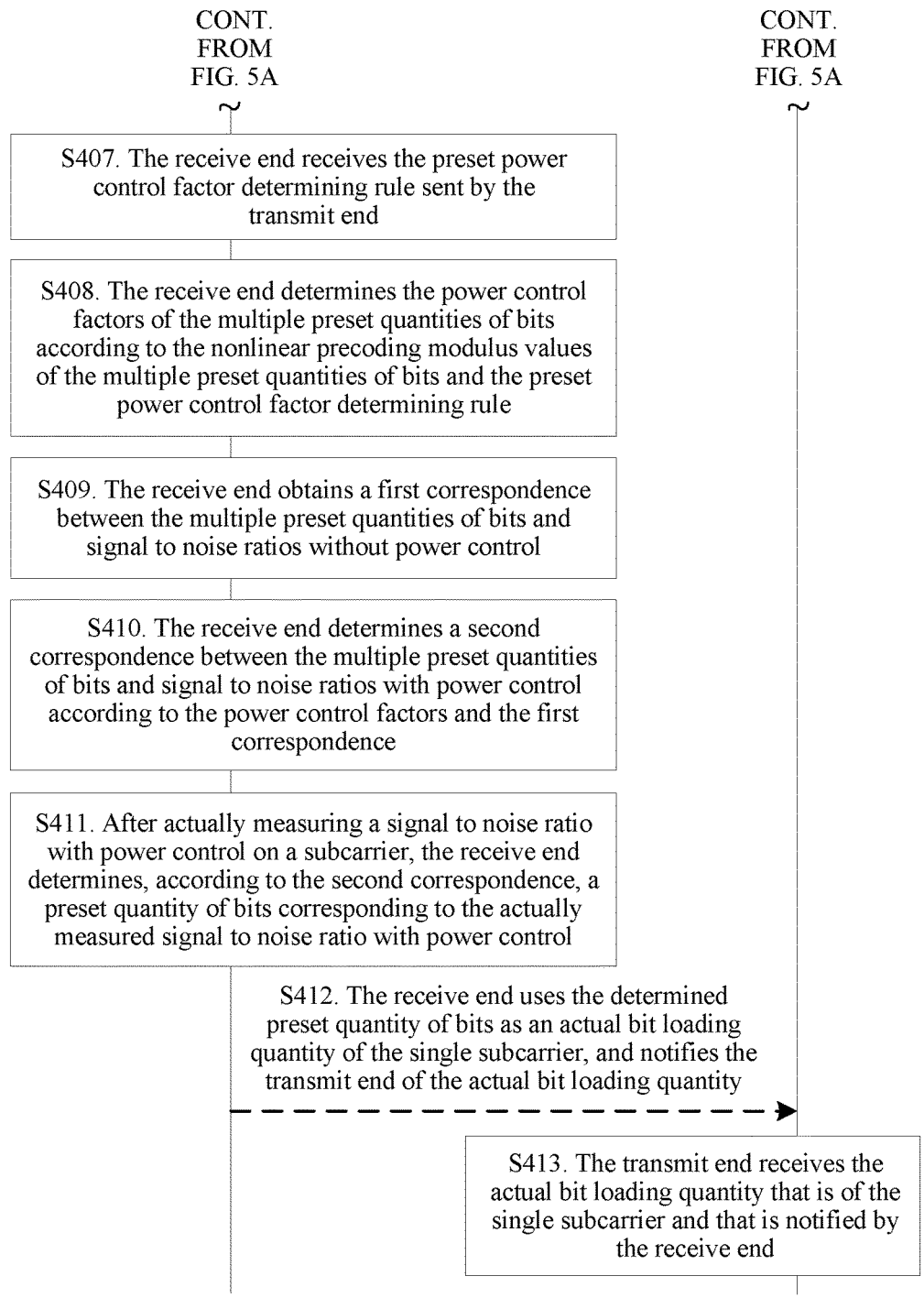

FIG. 5A and FIG. 5B are a schematic flowchart of a nonlinear precoding bit loading method according to Embodiment 4 of the present invention. In the foregoing embodiment, a receive end directly determines nonlinear precoding modulus values of multiple preset quantities of bits, and sends the nonlinear precoding modulus values to a transmit end, and the transmit end determines power control factors of the multiple preset quantities of bits. However, in this embodiment, the receive end only needs to send a parameter used to determine the nonlinear precoding modulus values of the multiple preset quantities of bits to the transmit end, and the transmit end only needs to send a determining rule used to determine the power control factors of the multiple preset quantities of bits to the receive end. An execution body of the following steps may be the receive end, and in actual implementation, the execution body may be a client that receives a DSL signal. The foregoing transmit end may be a DSLAM.

Specifically, as shown in FIG. 5A and FIG. 5B, the method includes the following steps.

S401. The receive end obtains a preset modulus value determining rule and a preset modulus value determining parameter.

The preset modulus value determining rule and the preset modulus value determining parameter may be preset at the receive end, or may be learned by the receive end from a notification message sent from a higher layer. This is not limited herein.

Optionally, after obtaining the preset modulus value determining rule and the preset modulus value determining parameter, the receive end may determine nonlinear precoding modulus values of multiple preset quantities of bits according to the preset modulus value determining rule and the preset modulus value determining parameter. A specific process of determining the nonlinear precoding modulus values is the same as that of step S301, and details are not described herein again.

S402. The receive end sends the preset modulus value determining rule and the preset modulus value determining parameter to the transmit end.

S403. The transmit end receives the preset modulus value determining rule and the preset modulus value determining parameter that are sent by the receive end.

S404. The transmit end determines nonlinear precoding modulus values of multiple preset quantities of bits according to the preset modulus value determining rule and the preset modulus value determining parameter.

This step is the same as step S301 in which the receive end determines the nonlinear precoding modulus values of the multiple preset quantities of bits, and details are not described herein again.

S405. The transmit end determines power control factors of the multiple preset quantities of bits according to the nonlinear precoding modulus values of the multiple preset quantities of bits and a preset power control factor determining rule.

This step is the same as step S304, and details are not described herein again.

S406. The transmit end sends the preset power control factor determining rule to the receive end.

S407. The receive end receives the preset power control factor determining rule sent by the transmit end.

S408. The receive end determines the power control factors of the multiple preset quantities of bits according to the nonlinear precoding modulus values of the multiple preset quantities of bits and the preset power control factor determining rule.

This step is the same as step S304 in which the transmit end determines the power control factors of the multiple preset quantities of bits, and details are not described herein again.

S409. The receive end obtains a first correspondence between the multiple preset quantities of bits and signal to noise ratios without power control.

Description of this step is the same as that of step S102, and details are not described herein again.

S410. The receive end determines a second correspondence between the multiple preset quantities of bits and signal to noise ratios with power control according to the power control factors and the first correspondence.

S411. After actually measuring a signal to noise ratio with power control on a subcarrier, the receive end determines, according to the second correspondence, a preset quantity of bits corresponding to the actually measured signal to noise ratio with power control.

S412. The receive end uses the determined preset quantity of bits as an actual bit loading quantity of the single subcarrier, and notifies the transmit end of the actual bit loading quantity.

Description of the foregoing steps S410 to S412 is separately the same as that of steps S103 and S104. It should be noted that there is no limitation on a sequence of implementing steps S401 to S408 and step S409.

S413. The transmit end receives the actual bit loading quantity that is of the single subcarrier and that is notified by the receive end.

This step is the same as step S201, and details are not described herein again.

Optionally, after step S411, the single subcarrier is used as an example. After the actual bit loading quantity on the subcarrier is determined, the transmit end may send information about the actual bit loading quantity to the receive end by using the subcarrier and according to a power control factor of the subcarrier, and the receive end may also receive, by using the subcarrier, the information that is about the actual bit loading quantity and that is sent by the transmit end.

Embodiment 3 and Embodiment 4 are merely examples for description. In actual implementation, the nonlinear precoding modulus values of the multiple preset quantities of bits and the power control factors may be determined not only at the receive end, but also at the transmit end, and this is not limited to the implementation manners enumerated in the foregoing embodiments. For example, the transmit end may determine the nonlinear precoding modulus values of the multiple preset quantities of bits, determine the power control factors of the multiple preset quantities of bits, and send the nonlinear precoding modulus values and the power control factors to the receive end; or the transmit end receives the nonlinear precoding modulus values of the multiple preset quantities of bits, and sends the preset power control factor determining rule to the receive end. These are not limited.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 6:
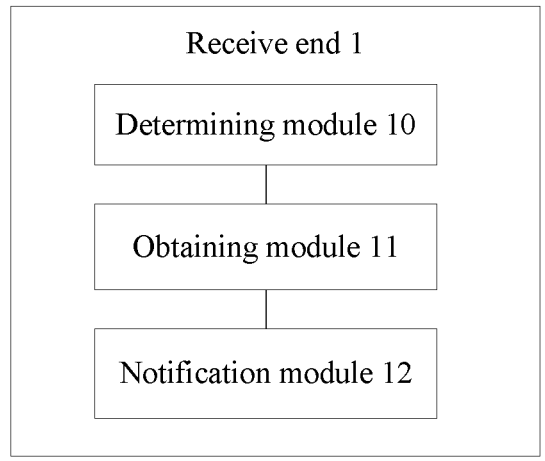
FIG. 6 is a schematic structural diagram of a receive end according to Embodiment 5 of the present invention.

FIG. 6 is a schematic structural diagram of a receive end according to Embodiment 5 of the present invention. As shown in FIG. 6, a receive end 1 includes a determining module 10, an obtaining module 11, and a notification module 12.

Specifically, the determining module 10 is configured to determine power control factors of multiple preset quantities of bits, where the receive end 1 supports information transmission in multiple bit loading modes, and the multiple bit loading modes refer to multiple modes in which the multiple preset quantities of bits are separately loaded on a single subcarrier. The obtaining module 11 is configured to obtain a first correspondence between the multiple preset quantities of bits and signal to noise ratios without power control. The determining module 10 is further configured to determine a second correspondence between the multiple preset quantities of bits and signal to noise ratios with power control according to the power control factors and the first correspondence, where each of the power control factors reflects a relationship between a signal to noise ratio without power control and a signal to noise ratio with power control. The determining module 10 is further configured to: after actually measuring a signal to noise ratio with power control on the subcarrier, determine, according to the second correspondence, a preset quantity of bits corresponding to the actually measured signal to noise ratio with power control. The notification module 12 is configured to use the determined preset quantity of bits as an actual bit loading quantity of the single subcarrier, and notify a transmit end of the actual bit loading quantity.

Further, the determining module 10 is specifically configured to determine the power control factors of the multiple preset quantities of bits according to a preset modulus value determining rule, a preset modulus value determining parameter, and a preset power control factor determining rule.

Still further, the determining module 10 is specifically configured to send nonlinear precoding modulus values of the multiple preset quantities of bits, or a preset modulus value determining rule and a preset modulus value determining parameter to the transmit end, so that the transmit end determines the power control factors of the multiple preset quantities of bits; and receive the power control factors that are of the multiple preset quantities of bits and that are sent by the transmit end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 7:
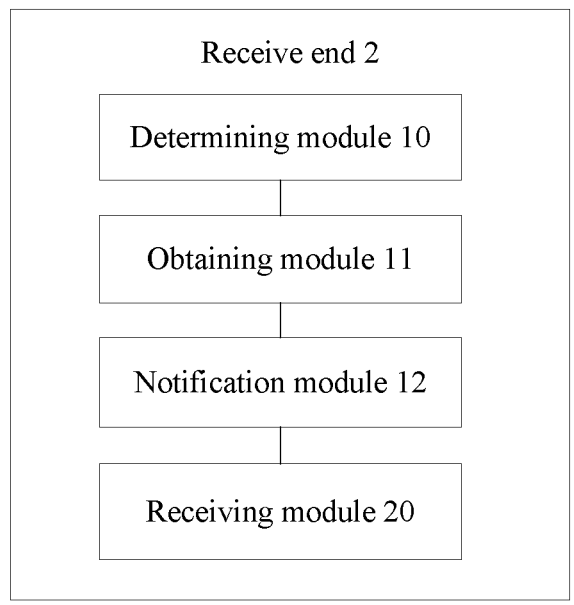
FIG. 7 is a schematic structural diagram of a receive end according to Embodiment 6 of the present invention.

FIG. 7 is a schematic structural diagram of a receive end according to Embodiment 6 of the present invention. As shown in FIG. 7, a receive end 2 includes a determining module 10, an obtaining module 11, a notification module 12, and a receiving module 20. The determining module 10, the obtaining module 11, and the notification module 12 are the same as those in the foregoing embodiment, and details are not described herein again.

Specifically, the receiving module 20 is configured to receive the preset power control factor determining rule sent by the transmit end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 8:
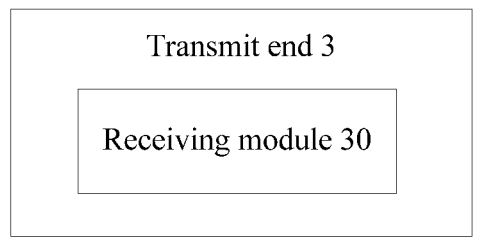
FIG. 8 is a schematic structural diagram of a transmit end according to Embodiment 7 of the present invention.

FIG. 8 is a schematic structural diagram of a transmit end according to Embodiment 7 of the present invention. As shown in FIG. 8, a transmit end 3 includes a receiving module 30.

Specifically, the receiving module 30 is configured to receive an actual bit loading quantity that is of a single subcarrier and that is notified by a receive end. The actual bit loading quantity of the single subcarrier is determined according to a second correspondence between multiple preset quantities of bits and signal to noise ratios with power control after the receive end actually measures a signal to noise ratio with power control on the subcarrier, and is a preset quantity of bits corresponding to the actually measured signal to noise ratio with power control. The second correspondence is determined by the receive end according to power control factors that are of the multiple preset quantities of bits and that are determined by the receive end and according to a first correspondence that is between the multiple preset quantities of bits and signal to noise ratios without power control and that is obtained by the receive end, and each of the power control factors reflects a relationship between a signal to noise ratio without power control and a signal to noise ratio with power control. The receive end supports information transmission in multiple bit loading modes, and the multiple bit loading modes refer to multiple modes in which the multiple preset quantities of bits are separately loaded on the single subcarrier.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 9:
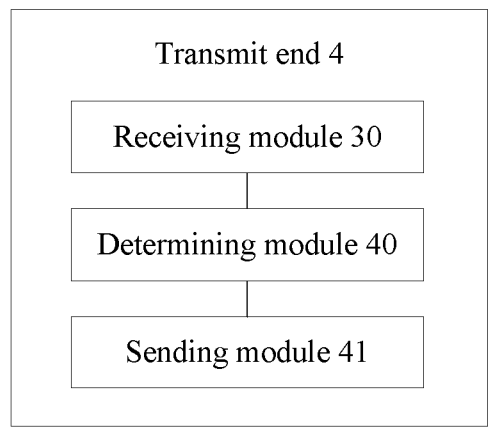
FIG. 9 is a schematic structural diagram of a transmit end according to Embodiment 8 of the present invention.

FIG. 9 is a schematic structural diagram of a transmit end according to Embodiment 8 of the present invention. As shown in FIG. 9, a transmit end 4 includes a receiving module 30, a determining module 40, and a sending module 41. The receiving module 30 is the same as that in the foregoing embodiment. In addition, the receiving module 30 is further configured to receive nonlinear precoding modulus values that are of the multiple preset quantities of bits and that are sent by the receive end. The determining module 40 is configured to determine the power control factors of the multiple preset quantities of bits according to the nonlinear precoding modulus values and a preset power control factor determining rule. The sending module 41 is configured to send the power control factors of the multiple preset quantities of bits to the receive end.

Alternatively, the receiving module 30 is further configured to receive a preset modulus value determining rule and a preset modulus value determining parameter that are sent by the receive end. Optionally, the determining module 40 is configured to determine the power control factors of the multiple preset quantities of bits according to the preset modulus value determining rule, the preset modulus value determining parameter, and a preset power control factor determining rule. The sending module 41 is configured to send the power control factors of the multiple preset quantities of bits to the receive end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 10:
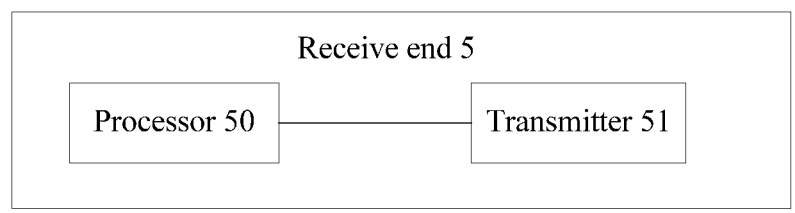
FIG. 10 is a schematic structural diagram of a receive end according to Embodiment 9 of the present invention.

FIG. 10 is a schematic structural diagram of a receive end according to Embodiment 9 of the present invention. As shown in FIG. 10, a receive end 5 includes a processor 50 and a transmitter 51.

Specifically, the processor 50 is configured to determine power control factors of multiple preset quantities of bits, where the receive end supports information transmission in multiple bit loading modes, and the multiple bit loading modes refer to multiple modes in which the multiple preset quantities of bits are separately loaded on a single subcarrier. The processor 50 is further configured to obtain a first correspondence between the multiple preset quantities of bits and signal to noise ratios without power control. The processor 50 is further configured to determine a second correspondence between the multiple preset quantities of bits and signal to noise ratios with power control according to the power control factors and the first correspondence, where each of the power control factors reflects a relationship between a signal to noise ratio without power control and a signal to noise ratio with power control. The processor 50 is further configured to: after actually measuring a signal to noise ratio with power control on the subcarrier, determine, according to the second correspondence, a preset quantity of bits corresponding to the actually measured signal to noise ratio with power control. The transmitter 51 is configured to use the determined preset quantity of bits as an actual bit loading quantity of the single subcarrier, and notify a transmit end of the actual bit loading quantity.

Further, the processor 50 is specifically configured to determine the power control factors of the multiple preset quantities of bits according to a preset modulus value determining rule, a preset modulus value determining parameter, and a preset power control factor determining rule.

Still further, the processor 50 is specifically configured to send nonlinear precoding modulus values of the multiple preset quantities of bits, or a preset modulus value determining rule and a preset modulus value determining parameter to the transmit end, so that the transmit end determines the power control factors of the multiple preset quantities of bits; and receive the power control factors that are of the multiple preset quantities of bits and that are sent by the transmit end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 11:
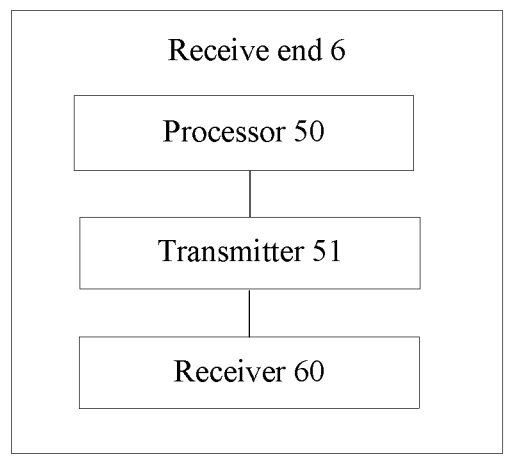
FIG. 11 is a schematic structural diagram of a receive end according to Embodiment 10 of the present invention.

FIG. 11 is a schematic structural diagram of a receive end according to Embodiment 10 of the present invention. As shown in FIG. 11, a receive end 6 includes a processor 50, a transmitter 51, and a receiver 60. The processor 50 and the transmitter 51 are the same as those in the foregoing embodiment, and details are not described herein again.

Specifically, the receiver 60 is configured to receive the preset power control factor determining rule sent by the transmit end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 12:
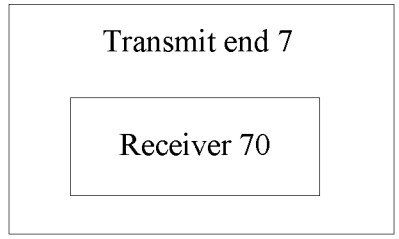
FIG. 12 is a schematic structural diagram of a transmit end according to Embodiment 11 of the present invention.

FIG. 12 is a schematic structural diagram of a transmit end according to Embodiment 11 of the present invention. As shown in FIG. 12, a transmit end 7 includes a receiver 70.

Specifically, the receiver 70 is configured to receive an actual bit loading quantity that is of a single subcarrier and that is notified by a receive end. The actual bit loading quantity of the single subcarrier is determined according to a second correspondence between multiple preset quantities of bits and signal to noise ratios with power control after the receive end actually measures a signal to noise ratio with power control on the subcarrier, and is a preset quantity of bits corresponding to the actually measured signal to noise ratio with power control. The second correspondence is determined by the receive end according to power control factors that are of the multiple preset quantities of bits and that are determined by the receive end and according to a first correspondence that is between the multiple preset quantities of bits and signal to noise ratios without power control and that is obtained by the receive end, and each of the power control factors reflects a relationship between a signal to noise ratio without power control and a signal to noise ratio with power control. The receive end supports information transmission in multiple bit loading modes, and the multiple bit loading modes refer to multiple modes in which the multiple preset quantities of bits are separately loaded on the single subcarrier.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 13:
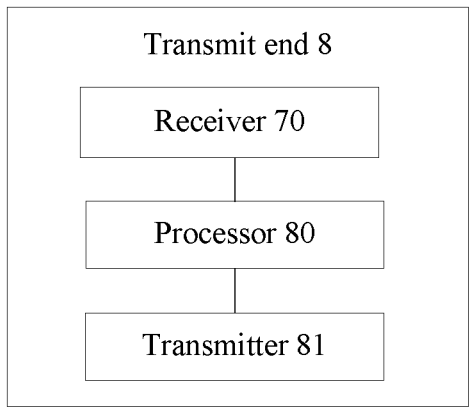
FIG. 13 is a schematic structural diagram of a transmit end according to Embodiment 12 of the present invention.

FIG. 13 is a schematic structural diagram of a transmit end according to Embodiment 12 of the present invention. As shown in FIG. 13, a transmit end 8 includes a receiver 70, a processor 80, and a transmitter 81. The receiver 70 is the same as that in the foregoing embodiment. In addition, the receiver 70 is further configured to receive nonlinear precoding modulus values that are of the multiple preset quantities of bits and that are sent by the receive end. The processor 80 is configured to determine the power control factors of the multiple preset quantities of bits according to the nonlinear precoding modulus values and a preset power control factor determining rule. The transmitter 81 is configured to send the power control factors of the multiple preset quantities of bits to the receive end.

Alternatively, the receiver 70 is further configured to receive a preset modulus value determining rule and a preset modulus value determining parameter that are sent by the receive end. The processor 80 is configured to determine the power control factors of the multiple preset quantities of bits according to the preset modulus value determining rule, the preset modulus value determining parameter, and a preset power control factor determining rule. The transmitter 81 is configured to send the power control factors of the multiple preset quantities of bits to the receive end.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 14:
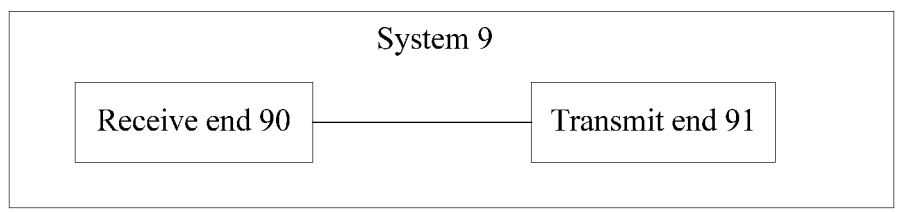
FIG. 14 is a schematic structural diagram of a system according to Embodiment 13 of the present invention.

FIG. 14 is a schematic structural diagram of a system according to Embodiment 13 of the present invention. As shown in FIG. 14, a system 9 includes a receive end 90 and a transmit end 91.

Specifically, the receive end 90 may be any one of the receive ends in the foregoing Embodiment 5 and Embodiment 6. The transmit end 91 may be any one of the transmit ends in the foregoing Embodiment 7 and Embodiment 8.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

Figure 15:
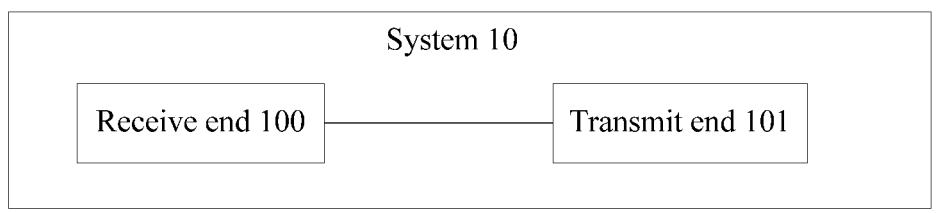
FIG. 15 is a schematic structural diagram of a system according to Embodiment 14 of the present invention.

FIG. 15 is a schematic structural diagram of a system according to Embodiment 14 of the present invention. As shown in FIG. 15, a system 10 includes a receive end 100 and a transmit end 101.

Specifically, the receive end 100 may be any one of the receive ends in the foregoing Embodiment 9 and Embodiment 10. The transmit end 101 may be any one of the transmit ends in the foregoing Embodiment 11 and Embodiment 12.

In the bit loading solution in this embodiment of the present invention, a receive end determines power control factors of multiple preset quantities of bits, where the receive end supports information transmission in multiple bit loading modes, and the multiple bit loading modes refer to multiple modes in which the multiple preset quantities of bits are separately loaded on a single subcarrier; the receive end obtains a first correspondence between the multiple preset quantities of bits and signal to noise ratios without power control, and determines a second correspondence between the multiple preset quantities of bits and signal to noise ratios with power control according to the power control factors and the first correspondence, where each of the power control factors reflects a relationship between a signal to noise ratio without power control and a signal to noise ratio with power control; and after actually measuring a signal to noise ratio with power control on the subcarrier, the receive end determines, according to the second correspondence, a preset quantity of bits corresponding to the actually measured signal to noise ratio with power control, uses the determined preset quantity of bits as an actual bit loading quantity of the single subcarrier, and notifies a transmit end of the actual bit loading quantity. Compared with a bit loading solution in the prior art, when determining the actual bit loading quantity of the single subcarrier, the receive end in this embodiment of the present invention considers the power control factors of the multiple preset quantities of bits, that is, the receive end considers power control performed by the transmit end on a sent signal, that is, power adjustment performed by the transmit end on the sent signal. In other words, a factor that prevents the receive end from reaching an expected bit error rate is considered. Therefore, when a system uses nonlinear precoding, according to the bit loading solution provided in this embodiment of the present invention, the receive end can reach the expected bit error rate, and system reliability is high.

In the several embodiments provided in this application, it should be understood that the disclosed device and method may be implemented in other manners. For example, the described device embodiment is merely an example. For example, the unit or module division is merely logical function division and may be other division in actual implementation. For example, a plurality of units or modules may be combined or integrated into another system, or some features may be ignored or not performed. In addition, a processing method, for implementing a specific function, mentioned in the foregoing apparatus embodiment includes but is not limited to a corresponding processing method disclosed in the method embodiment. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A nonlinear precoding bit loading method, comprising:
    determining, by a receive end, power control factors of multiple preset quantities of bits, wherein the receive end supports information transmission in multiple bit loading modes, and the multiple bit loading modes refer to multiple modes in which the multiple preset quantities of bits are separately loaded on a single subcarrier;
    obtaining, by the receive end, a first correspondence between the multiple preset quantities of bits and signal to noise ratios without power control;
    determining, by the receive end, a second correspondence between the multiple preset quantities of bits and signal to noise ratios with power control according to the power control factors and the first correspondence, wherein each of the power control factors reflects a relationship between a signal to noise ratio without power control and a signal to noise ratio with power control; and after actually measuring a signal to noise ratio with power control on the subcarrier, determining, by the receive end according to the second correspondence, a preset quantity of bits corresponding to the actually measured signal to noise ratio with power control, using the determined preset quantity of bits as an actual bit loading quantity of the single subcarrier, and notifying a transmit end of the actual bit loading quantity.

2. The method according to claim 1, wherein the determining, by a receive end, power control factors of multiple preset quantities of bits comprises:

determining, by the receive end, the power control factors of the multiple preset quantities of bits according to a preset modulus value determining rule, a preset modulus value determining parameter, and a preset power control factor determining rule.

3. The method according to claim 2, wherein before the determining, by the receive end, the power control factors of the multiple preset quantities of bits, the method further comprises:

receiving, by the receive end, the preset power control factor determining rule sent by the transmit end.

4. The method according to claim 1, wherein the determining, by a receive end, power control factors of multiple preset quantities of bits comprises:

sending, by the receive end to the transmit end, nonlinear precoding modulus values of the multiple preset quantities of bits, or a preset modulus value determining rule and a preset modulus value determining parameter, so that the transmit end determines the power control factors of the multiple preset quantities of bits; and receiving, by the receive end, the power control factors that are of the multiple preset quantities of bits and that are sent by the transmit end.

5. The method according to claim 2, wherein the preset modulus value determining rule and the preset modulus value determining parameter are used to obtain the nonlinear precoding modulus values of the multiple preset quantities of bits.

6. A nonlinear precoding bit loading method, comprising:

receiving, by a transmit end, nonlinear precoding modulus values that are of the multiple preset quantities of bits and that are sent by a receive end;

determining, by the transmit end, power control factors of the multiple preset quantities of bits according to the nonlinear precoding modulus values and a preset power control factor determining rule;

sending, by the transmit end, the power control factors of the multiple preset quantities of bits to the receive end; and receiving, by the transmit end, an actual bit loading quantity that is of a single subcarrier and that is notified by the receive end, the actual bit loading quantity based upon the power control factors.

7. The method according to claim 6, wherein before the receiving, by the transmit end, an actual bit loading quantity that is of a single subcarrier and that is notified by a receive end, the method further comprises:

sending, by the transmit end, a preset power control factor determining rule to the receive end, to enable the receive end to determine the power control factors of the multiple preset quantities of bits.

8. The method according to claim 6, wherein before the receiving, by the transmit end, an actual bit loading quantity that is of a single subcarrier and that is notified by a receive end, the method further comprises:

receiving, by the transmit end, a preset modulus value determining rule and a preset modulus value determining parameter that are sent by the receive end;

determining, by the transmit end, the power control factors of the multiple preset quantities of bits according to the preset modulus value determining rule, the preset modulus value determining parameter, and a preset power control factor determining rule; and sending, by the transmit end, the power control factors of the multiple preset quantities of bits to the receive end.

9. A receive end, comprising:

a non-transitory computer readable storage medium to store program(s), and computer hardware configured to implement, including configured by the program(s) to implement:

a determining module, configured to determine power control factors of multiple preset quantities of bits, wherein the receive end supports information transmission in multiple bit loading modes, and the multiple bit loading modes refer to multiple modes in which the multiple preset quantities of bits are separately loaded on a single subcarrier;

an obtaining module, configured to obtain a first correspondence between the multiple preset quantities of bits and signal to noise ratios without power control; wherein the determining module is further configured to determine a second correspondence between the multiple preset quantities of bits and signal to noise ratios with power control according to the power control factors and the first correspondence, wherein each of the power control factors reflects a relationship between a signal to noise ratio without power control and a signal to noise ratio with power control; and the determining module is further configured to: after actually measuring a signal to noise ratio with power control on the subcarrier, determine, according to the second correspondence, a preset quantity of bits corresponding to the actually measured signal to noise ratio with power control; and a notification module, configured to use the determined preset quantity of bits as an actual bit loading quantity of the single subcarrier, and notify a transmit end of the actual bit loading quantity.

10. The receive end according to claim 9, wherein the determining module is configured to:

determine the power control factors of the multiple preset quantities of bits according to a preset modulus value determining rule, a preset modulus value determining parameter, and a preset power control factor determining rule.

11. The receive end according to claim 9, wherein the determining module is configured to:

send nonlinear precoding modulus values of the multiple preset quantities of bits, or a preset modulus value determining rule and a preset modulus value determining parameter to the transmit end, so that the transmit end determines the power control factors of the multiple preset quantities of bits; and receive the power control factors that are of the multiple preset quantities of bits and that are sent by the transmit end.

12. A transmit end, comprising:
a non-transitory computer readable storage medium to store program(s), and
computer hardware configured to implement, including configured by the program(s) to implement:
   a receiving module, configured to:
      receive an actual bit loading quantity that is of a single subcarrier and that is notified by a receive end, and
      receive nonlinear precoding modulus values that are of multiple preset quantities of bits and that are sent by the receive end; and
   a determining module, configured to:
      determine power control factors of the multiple preset quantities of bits according to the nonlinear precoding modulus values and a preset power control factor determining rule; and
   a sending module, configured to send the power control factors of the multiple preset quantities of bits to the receive end, the actual bit loading quantity based upon the power control factors.

13. The transmit end according to claim 12, wherein the receiving module is further configured to:
   receive a preset modulus value determining rule and a preset modulus value determining parameter that are sent by the receive end; and
the computer hardware is further configured to implement:
a determining module, configured to determine the power control factors of the multiple preset quantities of bits according to the preset modulus value determining rule, the preset modulus value determining parameter, and a preset power control factor determining rule; and
a sending module, configured to send the power control factors of the multiple preset quantities of bits to the receive end.

* * * * *